Patented Jan. 19, 1954

2,666,761

UNITED STATES PATENT OFFICE 2,666,761

TRINUCLEAR POLYMETHINE DYES CONTAINING A PYRRYL INDOLYL, OR PYRROCOLYL NUCLEUS

Donald W. Heseltine and Leslie G. S. Brooker, Rochester, N. Y., assignors to Eastman Kodak Company, Rochester, N. Y., a corporation of New Jersey No Drawing. Application January 23, 1952,
Serial No. 267,928

9 Claims. (Cl. 260—240.1)

This invention relates to polymethine dyes and more particularly to trinuclear polymethine dyes containing a pyrryl, indolyl, or pyrrocolyl nucleus. The dyes of our invention can be more accurately described as polymethine dyes containing a pyrryl, indolyl, or pyrrocolyl nucleus substituted on the polymethine bridge or intercyclic chain.

Polymethine dyes containing a pyrryl, indolyl, or pyrrocolyl nucleus have long been known, although such dyes have not, in general, been found to be especially useful in sensitizing photographic silver halide emulsions. Such prior art dyes have been used to advantage in photographic elements as light-filtering agents, however.

We have now found a new class of trinuclear dyes containing a pyrryl, indolyl, or pyrrocolyl nucleus which are especially useful in sensitizing photographic silver halide emulsions.

It is, therefore, an object of our invention to provide a new class of trinuclear dyes containing a pyrryl, indolyl, or pyrrocolyl nucleus. Another object is to provide methods of making such dyes. Still another object is to provide photographic silver halide emulsions sensitized with our new dyes. Another object is to provide a method of preparing such emulsions. A further object is to provide a new class of intermediates which are useful in preparing our new dyes. Other objects will become apparent from a consideration of the following description and examples.

According to our invention we provide new trinuclear dyes containing a pyrryl, indolyl, or pyrrocolyl nucleus selected from those represented by the following general formulas:

(phenylmethyl), β-phenylethyl, β-carboxyethyl, carboxymethyl, α-carboxyethyl, γ-carboxypropyl, β-acetoxyethyl, γ-acetoxypropyl, carbomethoxymethyl, β-carbomethoxyethyl, carbethoxymethyl, β-carbethoxyethyl, β-sulfoethyl, phenylmercaptomethyl, phenoxymethyl, β-phenylmercaptoethyl, β-phenoxyethyl, etc. (especially an alkyl group containing from 1 to 5 carbon atoms), $R_2$ represents a hydrogen atom, an alkyl group, such as methyl, ethyl, etc., or an aryl group, such as phenyl, o-, m-, and p-tolyl, o-, m-, and p-chlorophenyl, etc. (e. g. a mononuclear aromatic group of the benzene series). $R_3$ represents a hydrogen atom, an alkyl group, such as methyl, ethyl, n-propyl, n-amyl, n-heptyl, n-dodecyl, cyclohexyl, etc. or an aryl group, such as phenyl, o-, m-, and p-tolyl, etc., and $R_2$ and $R_3$ together represent the non-metallic atoms necessary to complete a heterocyclic nucleus of the pyridine series, Z and $Z_1$ each represents the non-metallic atoms necessary to complete a heterocyclic nucleus containing from 5 to 6 atoms in the heterocyclic ring, such as those selected from the group consisting of those of the thiazole series (e. g. thiazole, 4-methylthiazole, 5-methylthiazole, 4-phenylthiazole, 5-phenylthiazole, 4,5-dimethylthiazole, 4-(2-thienyl)thiazole, etc.), those of the benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole,

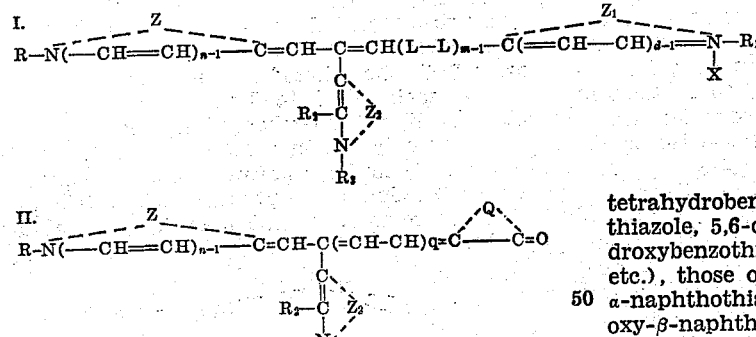

wherein R and $R_1$ each represents an alkyl group (i. e. an alcohol radical), e. g. methyl, ethyl, n-propyl, isobutyl, n-butyl, isoamyl, n-amyl, β-hydroxyethyl, γ-hydroxypropyl, β-methoxyethyl, β-ethoxyethyl, allyl, β-methylallyl, benzyl tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e. g. α-naphthothiazole, β-naphthothiazole, 5-methoxy-β-naphthothiazole, 5-ethoxy-β-naphthothiazole, 7-methoxy-α-naphthothiazole, 8-methoxy-α-naphthothiazole, etc.), those of the thionaphtheno-7', 6', 4,5-thiazole series (e. g. 4'-methoxythionaphtheno-7',6',4,5-thiazole, etc.), those of the oxazole series (e. g. 4-methyloxazole, 5-methyloxazole, 4-phenyloxazole, 4,5-diphenyloxazole, 4-ethyloxazole, 4,5-dimethyloxazole, 5-phenyloxazole, etc.), those of the benzoxazole series (e. g. benzoxazole, 5-chlorobenzoxazole, 5-phenylbenzoxazole, 5-methylbenzoxazole, 6-methylbenzoxazole, 5,6-dimethylbenzoxazole, 4,6-dimethylbenzoxazole, 5-methoxybenzoxazole, 6-methoxybenzoxazole, 5-ethoxybenzoxazole, 6-chlorobenzoxazole, 5-hydroxybenzoxazole, 6-hydrobenzoxazole, etc.), those of the naphthoxazole series (e. g. $\alpha$-naphthoxazole, $\beta$-naphthoxazole, etc.), those of the selenazole series (e. g. 4-methylselenazole, 4-phenylselenazole, etc.), those of the benzoselenazole series (e. g. benzoselenazole, 5-chlorobenzoselenazole, 5-methoxybenzoselenazole, 5-hydroxybenzoselenazole, tetrahydrobenzoselenazole, etc.), those of the naphthoselenazole series (e. g. $\alpha$-naphthoselenazole, $\beta$-naphthoselenazole, etc.), those of the thiazoline series (e. g. thiazoline, 4-methylthiazoline etc.), those of the 2-quinoline series (e. g. quinoline, 3-methylquinoline, 5-methylquinoline, 7-methylquinoline, 8-methylquinoline, 6-chloroquinoline, 8-chloroquinoline, 6-methoxyquinoline, 6-ethoxyquinoline, 6-hydroxyquinoline, 8-hydroxyquinoline, etc.), those of the 4-quinoline series (e. g. quinoline, 6-methoxyquinoline, 7-methylquinoline, 8-methylquinoline, etc.), those of the 1-isoquinoline series (e. g. isoquinoline, 3,4-dihydroisoquinoline, etc.), those of the 3-isoquinoline series (e. g. isoquinoline, etc.), those of the 3,3-dialkylindolenine series (e. g. 3,3-dimethylindolenine, 3,3,5-trimethylindolenine, 3,3,7-trimethylindolenine, etc.), those of the 2-pyridine series (e. g. pyridine, 3-methylpyridine, 4-methylpyridine, 5-methylpyridine, 6-methylpyridine, 3,4-dimethylpyridine, 3,5-dimethylpyridine, 3,6-dimethylpyridine, 4,5-dimethylpyridine, 4,6-dimethylpyridine, 4-chloropyridine, 5-chloropyridine, 6-chloropyridine, 3-hydroxypyridine, 4-hydroxypyridine, 5-hydroxypyridine, 6-hydroxypyridine, 3-phenylpyridine, 4-phenylpyridine, 6-phenylpyridine, etc.), those of the 4-pyridine series (e. g. 2-methylpyridine, 3-methylpyridine, 2-chloropyridine, 3-chloropyridine, 2,3-dimethylpyridine, 2,5-dimethylpyridine, 2,6-dimethylpyridine, 2-hydroxypyridine, 3-hydroxypyridine, etc.), etc. $Z_2$ represents the non-metallic atoms necessary to complete a pyrrole nucleus (includes simple pyrrole nuclei and condensed nuclei, e. g. indole), X represents an acid radical, e. g. chloride, bromide, iodide, thiocyanate, sulfamate, methylsulfate, ethylsulfate, perchlorate, benzenesulfonate, p-toluenesulfonate, xylenesulfonate, etc., L represents a methine group (substituted or unsubstituted, e. g. =CH—, =CCH$_3$—, etc.), $n$ and $d$ each represents a positive integer of from 1 to 2, $m$ and $q$ each represents a positive integer of from 1 to 3, and Q represents the non-metallic atoms necessary to complete a heterocyclic nucleus containing from 5 to 6 atoms in the heterocyclic ring, such as those selected from the group consisting of those of the thiazole series, for example: those of the 2,4(3,5)-thiazoledione series, such as 2,4(3,5)-thiazoledione, 3-alkyl-2,4(3,5)-thiazolediones (e. g. 3-ethyl-2,4-(3,5-thiazoledione, etc.), 3-phenyl-2,4(3,5)-thiazoledione, 3-$\alpha$-naphthyl-2,4(3,5)-thiazoledione, etc., those of the 2-thio-2,4(3,5)-thiazoledione (rhodanine) series, such as 3-alkyl-2-thio-2,4-(3,5)-thiazolediones (3-alkylrhodanines) (e. g. 3-ethyl-2-thio-2,4(3,5)-thiazoledione or 3-ethylrhodanine), 3-phenyl-2-thio-2,4(3,5)-thiazoledione (3-phenylrhodanine), 3-$\alpha$-naphthyl-2-thio-2,4(3,5)-thiazoledione (3-$\alpha$-naphthylrhodanine), 3-(1-benzothiazyl)-2-thio-2,4(3,5)-thiazoledione (2-(1-benzothiazyl)rhodanine), etc., those of the 2-alkylmercapto-4(5)-thiazolone series, such as 2-ethylmercapto-4(5)-thiazolone, etc., those of the thiazolidone series, such as 4-thiazolidone or its 3-alkyl (e. g. ethyl, etc.), 3-phenyl or 3-$\alpha$-naphthyl derivatives, those of the 2-alkylphenylamino-4(5)-thiazolone series (e. g. 2-ethylphenylamino-4(5)-thiazolone, etc.), those of the 2-diphenylamino-4(5)-thiazolone series; those of the oxazolone series, for example: those of the 2-thio-2,4(3,5)-oxazoledione series, such as 3-alkyl-2-thio-2,4(3,5)-oxazolediones (e. g. 3-ethyl-2-thio-2,4(3,5)-oxazoledione, etc.), those of the 2-imino-2,4(3,5)-oxazolone (pseudohydantoin) series, etc.; those of the imidazolone series, for example: those of the 2,4(3,5)-imidazoledione series, such as 2,4(3,5)-imidazoledione (hydantoin) or its 3-alkyl (e. g. ethyl, etc.), 3-phenyl or 3-$\alpha$-naphthyl derivatives as well as its 1,3-dialkyl (e. g. 1,3-diethyl, etc.), 1-alkyl-3-phenyl (e. g. 1-ethyl-3-phenyl, etc.), 1-alkyl-3-naphthyl (e. g. 1-ethyl-3-$\alpha$-naphthyl, etc.), 1,3-diphenyl, etc. derivatives, those of the 2-thio-2,4(3,5)-imidazoledione series, such as 2-thio-2,4(3,5)-imidazoledione (2-thiohydantoin) or its 3-alkyl (e. g. 3-ethyl, etc.), 3-phenyl or 3-$\alpha$-naphthyl derivatives as well as its 1,3-dialkyl (e. g. 1,3-diethyl, etc.), 1-alkyl-3-phenyl (e. g. 1-ethyl-3-phenyl, etc.), 1-alkyl-3-naphthyl (e. g. 1-ethyl-3-$\alpha$-naphthyl), 1,3-diphenyl, etc. derivatives, those of the 2-alkylmercapto-5(4)-imidazolone series, such as 2-n-propylmercapto-5(4)-imidazolone; those of the thionaphthenone series, such as 2(1)-thionaphthenone or 1(2)-thionaphthenone; those of the pyrazolone series, such as pyrazolone or its 1-alkyl (e. g. methyl, ethyl, etc.), 1-phenyl, 1-naphthyl (e. g. 1-$\alpha$-naphthyl), 3-alkyl (e. g. methyl, ethyl, etc.), 3-phenyl, 3-naphthyl (3-$\alpha$-naphthyl), 1-alkyl-3-phenyl (e. g. 1-methyl-3-phenyl, etc.) 3-alkyl-1-phenyl (e. g. 3-methyl-1-phenyl, etc.), 1,3-dialkyl (e. g. 1,3-dimethyl, etc.), 1,3-diphenyl, etc. derivatives; those of the oxindole series, such as 2,3-dihydro-3-ketoindole, and like five-membered heterocyclic nuclei; those of the 2,4,6-triketohexahydropyrimidine series, for example, 2,4,6-triketohexahydropyrimidine (barbituric acid), 2-thio-2,4,6-triketohexahydropyrimidine (2-thiobarbituric acid) as well as their 1-alkyl (e. g. 1-ethyl, etc.) or 1,3-dialkyl (1,3-diethyl, etc.) derivatives; those of the 3,4-dihydro-2(1)-quinolone series, such as 3,4-dihydro-2(1)-quinolone (dihydrocarbostyril); those of the 3,4-dihydro-2(1)-quinoxalone series, such as 3,4-dihydro-2(1)-quinoxalone (oxydihydroquinoxaline), etc.; those of the 3-phenomorpholone (1,4,3-benzoxazine-3(4)-one or benzo-$\beta$-morpholone) series, such as 3-phenomorpholone, etc.; those of the 1,4,2-benzothiazine-3(4)-one (ketodihydrobenzoparathiazine) series, such as ketodihydrobenzoparathiazine, etc., and like six-membered heterocyclic nuclei.

The new dyes of our invention represented by Formula I above can advantageously be prepared by condensing an intermediate selected from those represented by the following general formula:

III.

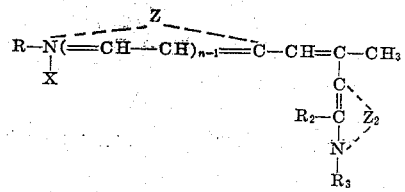

wherein R, $R_2$, $R_3$, Z, $Z_2$, X and $n$ each have the values given above with a cyclammonium quaternary salt selected from those represented by the following general formula:

IV.
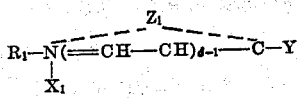

wherein $R_1$, $Z_1$, and $d$ have the values given above, $X_1$ represents an acid radical, such as those set forth above for X, and Y represents an electronegative group, such as an alkylmercapto group, an arylmercapto group, e. g.:

IVa. 

wherein $R_4$ represents an alkyl group or an aryl group, such as those given for $R_3$ above; or a β-arylaminovinyl or δ-arylaminobutadienyl group, e. g.:

IVb. 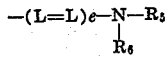

wherein $R_5$ represents an acyl group, such as acetyl, propionyl, benzoyl, etc. or a hydrogen atom, $R_6$ represents an aryl group, such as phenyl, o-, m- and p-tolyl, etc., and $e$ represents a positive integer of from 1 to 2; a halogen atom; etc.

The new dyes of our invention represented by Formula II above can advantageously be prepared by condensing an intermediate selected from those represented by Formula III above with an intermediate selected from those represented by the following general formula:

V.
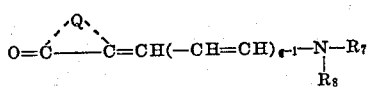

wherein $R_7$ represents an acyl group, such as acetyl, propionyl, benzoyl, etc., $R_8$ represents an aryl group, such as phenyl, o-, m-, and p-tolyl, etc., and Q and $q$ have the values given above.

The condensations of the compounds represented by Formula III with either the compounds of Formula IV or the compounds of Formula V can advantageously be accelerated by heating, e. g. at temperatures varying from room temperature (about 20° C.) to 100° C., or to the reflux temperature of the reaction medium. Inert solvents, such as the aliphatic alcohols, e. g. ethanol, n-propanol, n-butanol, etc., 1,4-dioxane, pyridine, etc. can be used. Basic condensing agents can also be employed to advantage. Typical basic condensing agents comprise the trialkylamines (e. g. triethylamine, tri-n-propylamine, tri-n-butylamine, triisoamylamine, etc.), the N,N-dialkylanilines (e. g. N,N-dimethylaniline, N,N-diethylaniline, etc.), the N-alkylpiperidines (e. g. N-methylpiperidine, N-ethylpiperidine, etc.), etc.

The intermediates represented by Formula III can advantageously be prepared by condensing a cyclammonium quaternary salt selected from those represented by the following general formula:

VI.
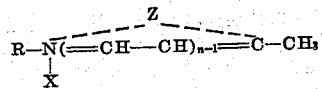

wherein R, Z, X, and $n$ have the values given above, together with an alkyl orthoacetate selected from those represented by the following general formula:

VII. 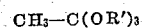

wherein R' represents an alkyl group, such as methyl, ethyl, etc., and a compound selected from those represented by the following general formula:

VIII.
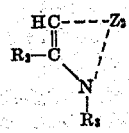

wherein $R_2$, and $R_3$, and $Z_2$ each have the values given above. One instance of the preparation of an intermediate Formula III can be represented by the following equation:

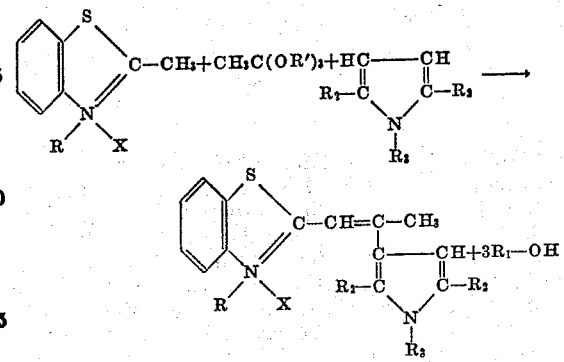

wherein R, $R_2$, $R_3$, R', and X have the values given above. The intermediates represented by Formula III above are new. The intermediates of Formula IV wherein Y represents a β-arylaminovinyl or δ-arylaminobutadienyl group have been previously described in the art. (See, for example, British Patent 344,409, accepted March 4, 1931.) The intermediates of Formula IV wherein Y represents an electro-negative group are also well known. (See, for example, British Patent 424,559, accepted February 18, 1935.) The intermediates of Formula V have also been previously described in the art. (See, for example, Dains et al.—"Jour. Am. Chem. Soc.," vol. 31 (1909), p. 1148; vol. 35 (1913), p. 959; vol. 38 (1916), p. 1841; vol. 40 (1918), p. 562; vol. 44 (1922), p. 2310; Berichte, vol. 35 (1902), p. 2496; and U. S. Patent 2,548,571, issued April 10, 1951.) The intermediates of Formulas VI, VII, and VIII have also been previously described in the art. (For example, those of Formula VI in U. S. Patent 2,537,880, issued January 9, 1951, those of Formula VIII in British Patent 529,440, accepted November 21, 1940, and those of Formula VII in U. S. Patent 1,994,563, issued March 19, 1935.)

The following examples will serve to illustrate more fully the manner whereby we practice our invention.

*Example 1.—9-(1-ethyl-2,5-dimethyl-3-pyrryl)- 3,3'-dimethylthiacarbocyanine iodide*

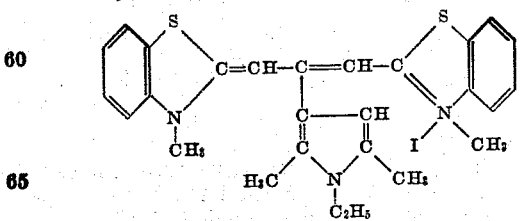

1-ethyl-2,3',5,6-tetramethyl-3-pyrrolothiacarbocyanine iodide (1.09 grams, 1 mol.) and 3-methyl-2-methylmercaptobenzothiazolium p-toluenesulfonate (0.92 gram, 1 mol.) were dissolved in ethyl alcohol (10 ml.) and triethylamine (0.5 ml., 2 mol.) was added. The reaction mixture was heated under reflux for ten minutes and the crude dye precipitated by the addition of water (100 ml.). The crude dye was filtered off, dried and then recrystallized from methyl alcohol; after two recrystallizations the yield of pure dye was 0.78 gram (53 percent); melting point 169°-170° C.

*Example 2.—9-(1-ethyl-3,5-dimethyl-3-pyrryl)-1',3-dimethylthia-2'-carbocyanine iodide*

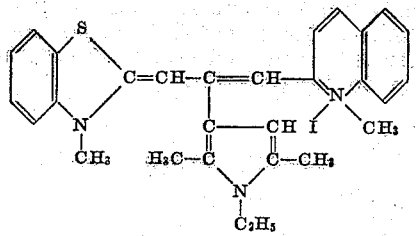

1-ethyl-2,3',5,6 - tetramethyl - 3 - pyrrolothiacarbocyanine iodide (1.09 grams, 1 mol.) and 1-methyl - 2 - phenylmercaptoquinolinium iodide (0.95 gram, 1 mol.) were dissolved in ethyl alcohol (15 ml.) and triethylamine (0.7 ml., 2 mol.) was added. The reaction mixture was heated under reflux for 15 minutes, then chilled overnight, filtered and the crude dye (93 percent) dried. After two recrystallizations from methyl alcohol the yield of pure dye was 0.97 gram (68 percent); melting point 250°-251° C.

*Analysis.*—Calculated for $C_{29}H_{30}IN_3S$: I, 21.90. Found: I, 21.8.

*Example 3.—1'-ethyl-9-(1-ethyl-2,5-dimethyl-3-pyrryl)-3-methylthia-4'-carbocyanine iodide*

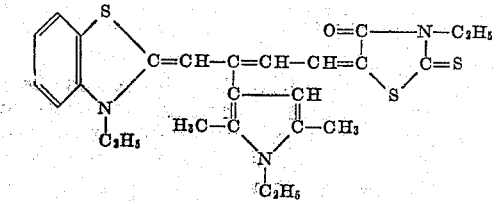

1-ethyl-2,3',5,6 - tetramethyl - 3 - pyrrolothiacarbocyanine iodide (1.09 grams, 1 mol.), 1-ethyl-4-ethylmercaptoquinolinium bromide (0.75 gram, 1 mol.) and triethylamine (0.7 ml., 2 mol.) were heated under reflux in ethyl alcohol (15 ml.) for 15 minutes.

*Example 4.—3,3'-diethyl-9-(1 - ethyl - 2,5 - dimethyl-3-pyrryl)-thiadicarbocyanine perchlorate*

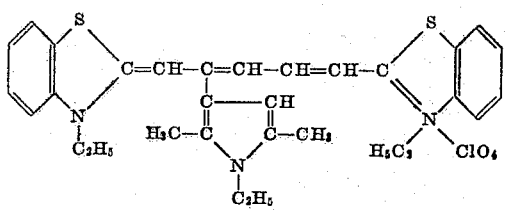

1,3'- diethyl - 2,5,6-trimethyl-3-pyrrolothiacarbocyanine iodide (1.13 grams, 1 mol.), 2-β-acetanilidovinylbenzothiazole ethiodide (1.13 grams, 1 mol.) and triethylamine (0.7 ml., 2 mol.) were refluxed in ethyl alcohol (15 ml.) for 15 minutes. The crude dye was precipitated by the addition of aqueous sodium perchlorate (2 grams in 50 ml.). The crude dye was filtered off, dried and twice recrystallized from methyl alcohol. The yield of pure dye was 0.97 gram (65 percent); melting point 205°-206° C.

*Example 5.—3-ethyl-5-[4-(3-ethyl-2(3H)-benzothiazolylidene)-3-(1-ethyl - 2,5 - dimethyl - 3-pyrryl)butenylidene]rhodanine*

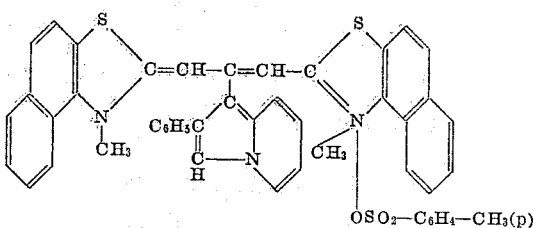

1,3' - diethyl - 2,5,6 - trimethyl - 3 - pyrrolothiacarbocyanine iodide (0.75 gram, 1 mol.), 5-acetanilidomethylene - 3 - ethylrhodanine (0.55 gram, 1 mol.) and triethylamine (0.5 ml., 2 mol.) were refluxed in ethyl alcohol (15 ml.) for 30 minutes. The crude dye was thrown out of solution by the addition of water (100 ml.), filtered, dried and twice recrystallized from pyridine and methyl alcohol. The yield of pure dye was 0.58 gram (70 percent); melting point 192°-193° C.

*Example 6.—3,3' - dimethyl - 9 - (2 - phenyl - 1 - pyrrocolyl) - 4,5,4',5' - dibenzothiacarbocyanine p-toluene-sulfonate*

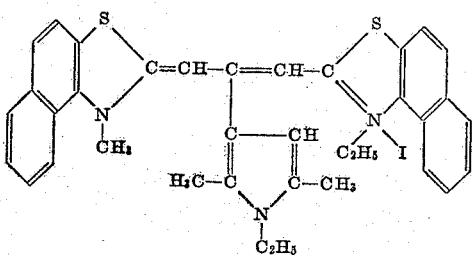

3' - methyl - 2 - phenyl - 4',5' - benzo - 1 - pyrrocolothiacarbocyanine p - toluenesulfonate (1.51 grams, 1 mol.), 1-methyl-2-methylmercaptonaphtho [1,2] thiazolium p-toluenesulfonate (1.05 grams, 1 mol.) and triethylamine (1.4 ml., 1 mol.+300% excess) were refluxed in ethyl alcohol (20 ml.) for twenty minutes. The reaction mixture was chilled, filtered, and the crude dye was washed with ether, water, and acetone, and dried. After two recrystallizations from methyl alcohol, the yield of purified dye was 25%; M. P. 294-5° C. dec.

*Example 7.—3 - ethyl - 9 - (1 - ethyl - 2,5 - dimethyl - 3 - pyrryl) - 3' - methyl - 4,5,4',5' - dibenzothiacarbocyanine iodide*

1 - ethyl - 2,3',5,6 - tetramethyl - 4',5' - benzo - 3-pyrrolothiacarbocyanine iodide (1.22 grams, 1 mol.), 1 - ethyl - 2 - ethylmercaptonaphtho [1,2] thiazolium bromide (0.90 gram, 1 mol.) and triethylamine (0.5 gram, 1 mol.+100% excess) were refluxed in ethyl alcohol (15 ml.) for thirty minutes. After chilling the reaction mixture, the crude dye was filtered off, washed with ether, water, and acetone, and then dried. After two recrystallizations from methyl alcohol, the yield of purified dye was 20%; M. P. 224-5° C. dec.

Example 8.—9 - (2,5 - dimethyl - 1 - phenyl - 3 - pyrryl) - 3,3' - dimethyl - 4,5,4',5' - dibenzothiacarbocyanine iodide

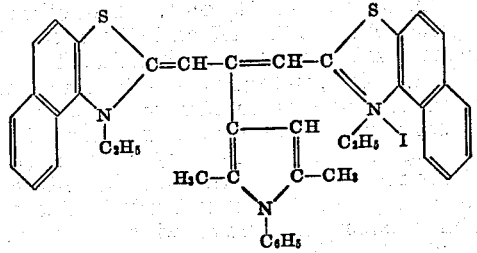

2,3',5,6 - tetramethyl - 1 - phenyl - 4',5' - benzo-3-pyrrolothiacarbocyanine iodide (0.83 gram, 1 mol.) and 1-methyl-2-methylmercaptonaphtho [1,2] thiazolium p-toluenesulfonate (1.04 grams, 1 mol.+70% excess) and triethylamine (1.0 ml., 1 mol+300% excess) were refluxed in ethyl alcohol (10 ml.) for one hour. The reaction mixture was chilled and filtered and the crude dye washed with water, methyl alcohol, and acetone, and dried. The yield of purified dye after two recrystallizations from methyl alcohol was 53%; M. P. 217°–18° C. dec.

Example 9.—3,3'-diethyl-9-(3-indolyl)-4,5,4',5'-dibenzoselenathiacarbocyanine iodide

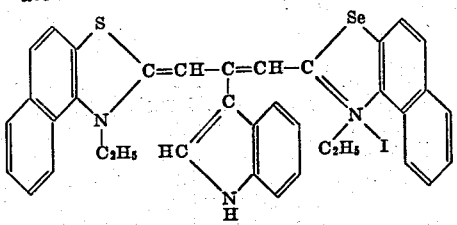

3' - ethyl - 8 - methyl - 4',5' - benzo - 3 - indolothiacarbocyanine iodide (0.50 gram, 1 mol.), 1-ethyl-2-ethylmercaptonaphtho [1,2] selenazolium ethosulfate (0.90 gram, 1 mol.+ 100% excess) and triethylamine (0.6 ml., 1 mol.+300% excess) were refluxed in ethyl alcohol (10 ml.) for one hour. The reaction mixture was filtered hot and the product was thoroughly washed with methyl alcohol and dried. The yield of purified dye was 59% after two recrystallizations from cresol and methyl alcohol; M. P. 281°–2° C. dec.

Example 10.—3,3' - dimethyl - 9 - (2 - methyl - 3 - indolyl) - 4,5,4',5' - dibenzothiacarbocyanine p-toluenesulfonate

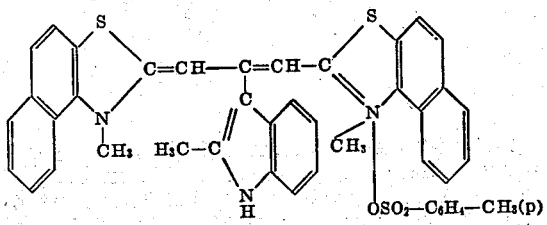

2,3',8-trimethyl-4',5'-benzo-3-indolothiacarbocyanine p-toluenesulfonate (1.04 grams, 1 mol.), 1 - methyl - 2 - methylmercaptonaphtho[1,2]-thiazolium p-toluenesulfonate (1.26 grams, 1 mol.+50% excess) and triethylamine (0.8 gram, 1 mol.+300% excess) were dissolved in ethyl alcohol (15 ml.) and heated under reflux for one hour. The reaction mixture was chilled and filtered and the crude dye was washed with water and acetone and dried. After two recrystallizations from methyl alcohol, the yield of purified dye was 42%; M. P. 287°–8° C. dec.

Example 11.—9 - (1,3 - dimethyl - 2 - indolyl) - 3,3' - diethyl - 4,5,4',5' - dibenzothiacarbocyanine bromide

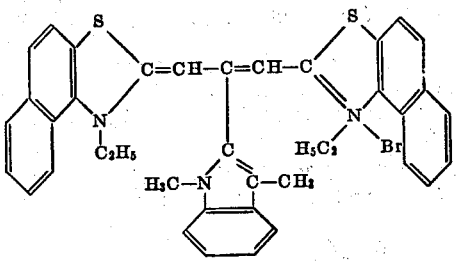

3' - ethyl - 1,3,8 - trimethyl - 4',5' - benzo - 2 - indolothiacarbocyanine bromide (0.57 gram, 1 mol.), 1 - ethyl - 2 - ethylmercaptonaphtho[1,2]-thiazolium bromide (0.71 gram, 1 mol.+100% excess) and triethylamine (0.6 ml., 1 mol.+300% excess) were refluxed in ethyl alcohol (10 ml.) for thirty minutes. The reaction mixture was filtered hot and the crude dye thoroughly washed with methyl alcohol and dried. After two recrystallizations from methyl alcohol, the yield of purified dye was 32%; M. P. 242°–3° C. dec.

Example 12.—3,3' - dimethyl - 9 - (2 - methyl - 3 - indolyl) oxacarbocyanine perchlorate

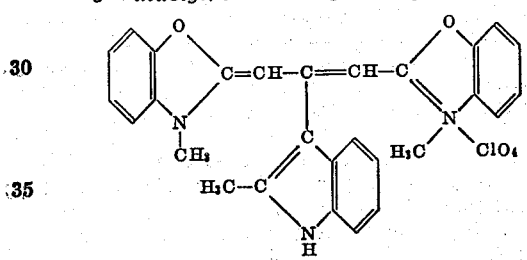

2,3',8 - trimethyl - 3 - indoloxacarbocyanine iodide (2.15 grams, 1 mol.), 3 - methyl - 2 - methylmercaptobenzoxazolium p - toluenesulfonate (3.4 grams, 1 mol.+100% excess) and triethylamine (1.4 ml., 1 mol.+100% excess) were refluxed in ethyl alcohol (20 ml.) for twenty minutes. The reaction mixture was chilled and the dye converted to the perchlorate by the addition of sodium perchlorate (5 grams) in water (100 ml.). The crude dye, after thoroughly washing with water and ether was dissolved in methyl alcohol (10 ml.), again precipitated by the addition of aqueous sodium perchlorate and then stirred until crystalline. The product was then filtered off and twice recrystallized from methyl alcohol. The yield of purified dye was 14%; M. P. 199°–200° C. dec.

Example 13.—3,3' - dimethyl - 9 - (3 - pyrryl) - 4,5,4',5' - dibenzothiacarbocyanine p-toluenesulfonate

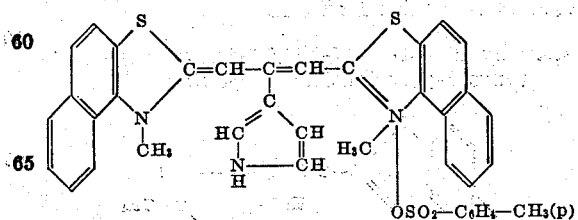

3',6 - dimethyl - 4',5' - benzo - 3 - pyrrolothiacarbocyanine p-toluene sulfonate (0.95 gram, 1 mol.), 1 - methyl - 2 - methylmercaptonaphtho-[1,2]thiazolium p-toluenesulfonate (1.66 grams, 1 mol.+100% excess) and thiethylamine (1.1 ml., 1 mol.+300% excess) were refluxed in ethyl alcohol (15 ml.) for thirty minutes. The reaction mixture was chilled and filtered and the crude dye washed with methyl alcohol and dried. After two recrystallizations from methyl alcohol the yield of purified dye was 47%; M. P. 272°–3° C. dec.

The following examples will serve to illustrate more fully the manner whereby we prepare the new intermediates represented by Formula III above.

*Example 14.—1,3' - diethyl - 2,5,6 - trimethyl - 3 - pyrrolothiacarbocyanine perchlorate*

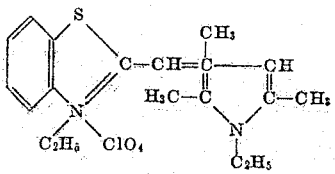

3-ethyl-2-methylbenzothiazolium- p - toluenesulfonate (34.9 grams, 1 mol.), 1-ethyl-2,5-dimethylpyrrole (14.6 grams, 1 mol.+10 percent excess) and ethyl orthoacetate (24.3 grams, 1 mol.+200 percent excess) were refluxed in ethyl alcohol (25 ml.) for 4 hours. The reaction mixture was chilled and treated with aqueous sodium iodide (20 grams in 150 ml.). The solid which separated was filtered off and discarded. The filtrate was treated with an additional 400 ml. of water and chilled overnight. The product which separated was filtered off, washed with acetone and dried. After conversion to the perchlorate and two recrystallizations from methyl alcohol (and filtered through decolorizing carbon) the yield of pure dye was 4.5 percent; melting point 188°–190° C.

*Analysis.*—Calculated for $C_{20}H_{25}ClN_2O_4S$: C, 56.54; H, 5.93. Found: C, 56.9; H, 6.7.

*Example 15.—1 - ethyl-2,3',5,6 - tetramethyl - 3- pyrrolothiacarbocyanine perchlorate*

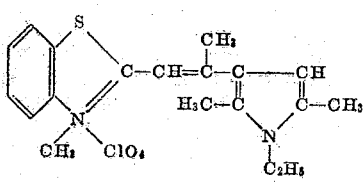

Replace the 3-ethyl-2-methylbenzothiazolium p-toluenesulfonate used in the above example by 1 mol. of 2,3-dimethylbenzothiazolium p-toluenesulfonate.

The dye iodides separated in Examples 14 and 15 above were converted to the perchlorates for more facile and accurate identification, although the dye iodides were most advantageously employed in the dye condensation to produce the dyes of Formulas I and II.

*Example 16.—1-ethyl-2,3',5,6-tetramethyl-4',5'- benzo-3-pyrrolothiacarbocyanine iodide*

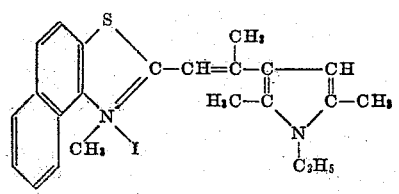

1,2-dimethylnaphtho[1,2]thiazolium p - toluenesulfonate (38.5 grams, 1 mol.), 1-ethyl-2,5-dimethylpyrrole ( 15 grams, 1 mol.+10% excess) and ethyl orthoacetate (24.3 grams, 1 mol.+200% excess) were refluxed in ethyl alcohol (100 ml.) for three hours. The reaction mixture was then treated with sodium iodide (20 grams) in water (200 ml.), chilled overnight and the solid filtered off and discarded. The solution was treated with an additional 200 ml. of water, chilled, and the aqueous layer decanted. The oily layer was repeatedly washed with water and ether and finally treated with aqueous sodium iodide. The aqueous layer was decanted and the residue stirred with acetone until crystalline and then filtered and dried. The crystalline product was stirred with cold pyridine (30 ml.), filtered, and the residue discarded. The pyridine solution was treated with stirring with ether (100 ml.) and the solid product filtered off and washed with ether. After two recrystallizations from methyl alcohol, the yield of pure dye was 14%; M. P. 173°–4° C. dec.

*Example 17.—2,3',5,6-tetramethyl - 1 - phenyl- 4',5'-benzo-3-pyrrolothiacarbocyanine iodide*

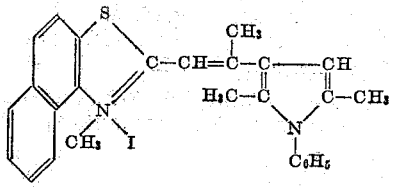

1,2-dimethylnaphtho[1,2]thiazolium p - toluenesulfonate (38.5 grams, 1 mol.), 2,5-dimethyl- 1-phenylpyrrole (20 grams, 1 mol.+10% excess) and ethyl orthoacetate (25.0 grams, 1 mol.+200% excess) were refluxed in ethyl alcohol for three hours and then treated with sodium iodide (20 grams) in water (400 ml.) and chilled overnight. The aqueous solution was decanted and the residue washed with water and ether and finally stirred with acetone until crystalline. The crude dye was filtered off and then boiled with water (200 ml.) and filtered hot. The residue was washed with acetone and dried. After two recrystallizations from methyl alcohol (and filtered through decolorizing carbon) the yield of pure dye was 2%; M. P. 192°–3° C. dec.

*Example 18.—3'-ethyl-8-methyl-4',5'-benzo-3- indolothiacarbocyanine iodide*

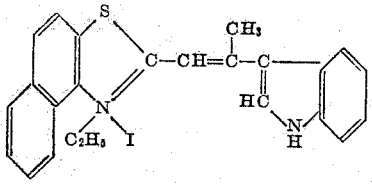

1-ethyl-2-methylnaphtho[1,2]thiazolium p-toluenesulfonate (20 grams, 1 mol.), indole (7.5 grams, 1 mol.+20% excess) and ethyl orthoacetate (16 grams, 1 mol.+300% excess) were dissolved in acetic acid (25 ml.) and heated under reflux for 30 minutes. The reaction mixture was cooled, poured into water (200 ml.) and stirred with ether (200 ml.). The ether and water were decanted and the crude dye was washed with water, dissolved in ethyl alcohol and converted to the iodide by the addition of sodium iodide (5 grams) in water (50 ml.). The crude iodide was filtered off, washed with acetone and dried. After two recrystallizations from methyl alcohol, the yield of pure dye was 5%; M. P. 231°–3° C. dec.

*Example 19.—2,3',8-trimethyl-4',5'-benzo-3-indolothiacarbocyanine p-toluenesulfonate*

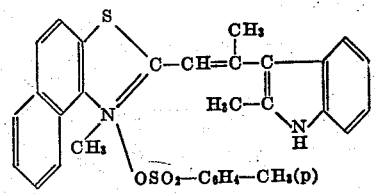

1,2-dimethylnaphtho[1,2]thiazolium p-toluenesulfonate (19.3 grams, 1 mol.), 2-methylindole (7.5 grams, 1 mol.+20% excess) and ethyl orthoacetate (16.2 grams, 1 mol.+300% excess) were refluxed in acetic acid (25 ml.) for 30 minutes. The reaction mixture was cooled and then poured into water (400 ml.) and stirred until crystallization started. The reaction mixture was then chilled overnight, filtered, and the crude dye stirred with acetone, again filtered, and dried. After two recrystallizations from methyl alcohol, the yield of pure dye was 27%; M. P. 212°–13° C. dec.

*Example 20.—3'-ethyl-1,3,8-trimethyl-4',5'-benzo-2-indolothiacarbocyanine iodide*

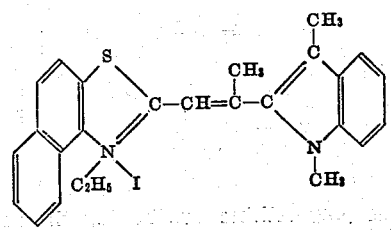

1-ethyl-2-methylnaphtho[1,2]thiazolium p-toluenesulfonate (20 grams, 1 mol.), 1,3-dimethylindole (7.25 grams, 1 mol.) and ethyl orthoacetate (16.2 grams, 1 mol.+300% excess) were dissolved in acetic acid (25 ml.) and heated rapidly to boiling over a free flame and boiled for thirty seconds. The reaction mixture was then poured into water (200 ml.) and treated with sodium iodide (20 grams). The aqueous portion was decanted and the solid washed with water. The dye was extracted from the quaternary salt with five 200 ml. portions of acetone. The acetone solutions were concentrated to 25 ml., chilled, filtered, and the crude dye dried. After two recrystallizations from methyl alcohol the yield of pure dye was 3%; M. P. 209°–10° C. dec.

*Example 21.—2,3',8-trimethyl-3'-indoloxacarbocyanine iodide*

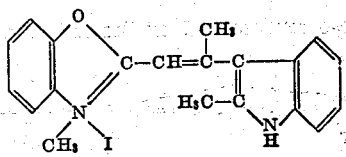

2,3-dimethylbenzoxazolium iodide (11.0 grams, 1 mol.), 2-methylindole (5.3 grams, 1 mol.), and ethyl orthoacetate (10 grams, 1 mol.+200% excess) were refluxed in acetic acid (15 ml.) for twenty minutes. The reaction mixture was then poured into cold water (200 ml.) and was treated with ether (150 ml.). The mixture was then filtered and the crude dye was washed with water, ether, and acetone. After two recrystallizations from methyl alcohol the yield was 9%; M. P. 263°–4° C. dec.

*Example 22.—3',6-dimethyl-4',5'-benzo-3-pyrrolothiacarbocyanine p-toluenesulfonate*

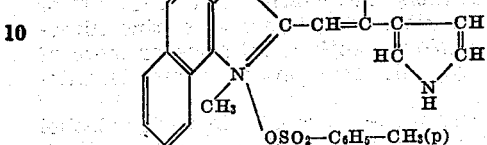

1,2-dimethylnaphtho[1,2]thiazolium p-toluenesulfonate (14.3 grams, 1 mol.), pyrrole (8 grams, 1 mol.+20% excess) and ethyl orthoacetate (16.2 grams, 1 mol.+300% excess) were refluxed in ethyl alcohol (50 ml.) for two hours. The reaction mixture was poured into cold water (200 ml.) and stirred until crystallization started. The mixture was then chilled, filtered, and the crude dye washed with water, ether, and acetone. After two recrystallizations from methyl alcohol, the yield was 8%; M. P. 223°–4° C. dec.

*Example 23.—3'-methyl-2-phenyl-4',5'-benzo-1-pyrrocolothiacarbocyanine p-toluenesulfonate*

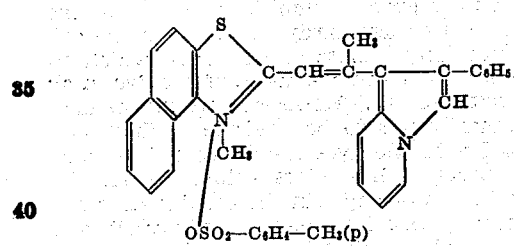

Replace the 2-methylindole of Example 19 with a molecularly equivalent amount of 2-phenylpyrrocoline. The dye was obtained as a thick oil, and was used as such in preparing the dye of Example 6.

We have found that our new dyes spectrally sensitized photographic silver halide emulsions when incorporated therein. The dyes are especially useful for extending the spectral sensitivity of the customarily employed gelatino-silver-chloride, gelatino-silver-chlorobromide, gelatino-silver-bromide and gelatino-silver-bromiodide developing-out emulsions. In the foregoing examples, the extent to which gelatino-silver-bromiodide developing-out emulsions can be sensitized as well as the point of maximum sensitivity are pointed out in connection with the dye of each example. To prepare emulsions sensitized with one or more of our new dyes, it is only necessary to disperse the dye or dyes in the emulsions. The methods of incorporating dyes in emulsions are simple and are known to those skilled in the art. In practice, it is convenient to add the dyes to the emulsions in the form of a solution in an appropriate solvent. Methanol has proved satisfactory as a solvent for most of our new dyes. Where the dyes are quite insoluble in methyl alcohol, for instance, a mixture of methanol and pyridine is advantageously employed as a solvent. The dyes are advantageously incorporated in the finished, washed emulsions and should be uniformly distributed throughout the emulsions.

The concentration of the dyes in the emulsions can vary widely, e. g. from 5 to 100 mg. per liter of flowable emulsion. The concentration of the dyes will vary accordingly to the type of emulsion and according to the effect desired. The suitable and most economical concentration for any given emulsion will be apparent to those skilled in the art, upon making the ordinary tests and observations customarily used in the art of emulsion making. To prepare a gelatino-silver-halide emulsion sensitized with one or more of our new dyes, the following procedure is satisfactory:

A quantity of dye is dissolved in methyl alcohol (or a mixture of methyl alcohol and pyridine) and a volume of this solution, which may be diluted with water, containing from 5 to 100 mg. of dye, is slowly added to about 1000 cc. of gelatino-silver-halide emulsion, with stirring. Stirring is continued until the dye is thoroughly dispersed in the emulsion.

With most of our dyes, from 10 to 20 mg. of dye per liter of gelatino-silver-bromide or bromiodide emulsion (containing about 40 g. of silver halide) suffices to produce the maximum sensitizing effect. With the finer grain emulsions, somewhat larger concentration of dye may be needed to produce the maximum sensitizing effect.

The above statements are only illustrative, as it will be apparent that the dyes can be incorporated in photographic emulsions by any of the other methods customarily employed in the art, e. g. by bathing a plate or film upon which an emulsion is coated in a solution of the dye in an appropriate solvent. However, bathing methods are ordinarily not to be preferred. Emulsions sensitized with the dyes can be coated on suitable supports, such as glass, cellulose derivative film, resin film or paper in the usual manner.

When preparing intermediates as described in Example 22 above, wherein unsubstituted pyrrole is employed, the condensation might result in the formation of 3',6 - dimethyl - 4',5' - benzo - 2-pyrrolothiacarbocyanine p-toluenesulfonate, although present evidence favors the compound depicted in Example 22.

What we claim as our invention and desire secured by Letters Patent of the United States is:

1. A polymethine dye selected from those represented by the following general formula:

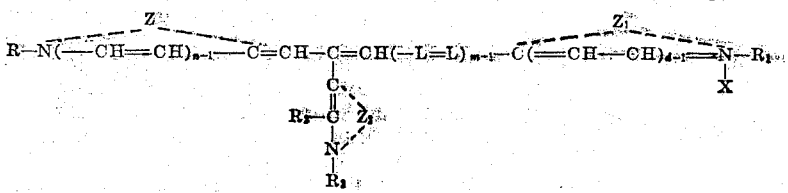

wherein R and R₁ each represents an alkyl group, R₂ and R₃ each represents a member selected from the group consisting of a hydrogen atom, an alkyl group, and an aryl group and R₂ and R₃ together represent the non-metallic atoms necessary to complete a heterocyclic nucleus of the pyridine series; Z and Z₁ each represents the non-metallic atoms necessary to complete a heterocyclic nucleus containing from 5 to 6 atoms in the heterocyclic ring; Z₂ represents the non-metallic atoms necessary to complete a heterocyclic nucleus of the pyrrole series; X represents an acid radical; L represents a methine group; m, n and d each represents a positive integer of from 1 to 2.

2. The polymethine dye having the following formula:

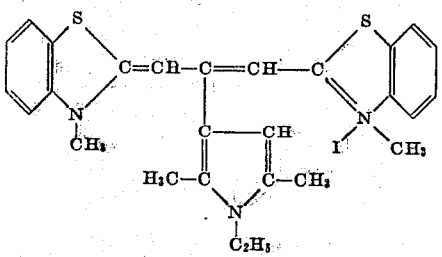

3. The polymethine dye having the following formula:

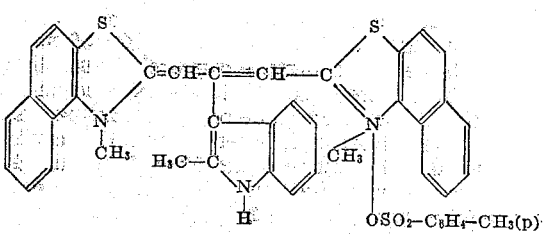

4. The polymethine dye having the following formula:

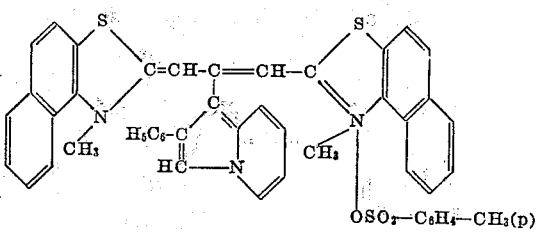

5. The polymethine dye having the following formula:

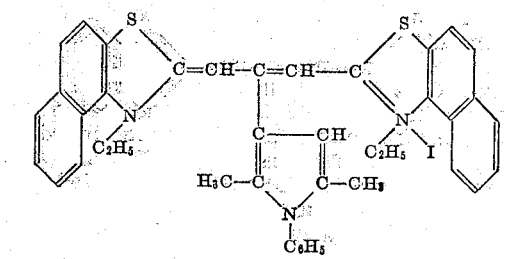

6. A process for preparing polymethine dyes comprising condensing a compound selected from those represented by the following general formula:

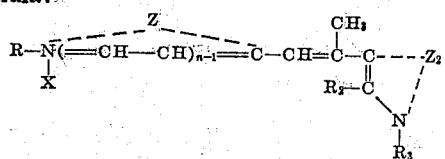

wherein R represents an alkyl group, R₂ and R₃ each represents a member selected from the group consisting of a hydrogen atom, an alkyl group, and an aryl group, and R₂ and R₃ together represent the non-metallic atoms necessary to complete a heterocyclic nucleus of the pyridine series, Z represents the non-metallic atoms necessary to complete a heterocyclic nucleus containing from 5 to 6 atoms in the heterocyclic ring, $Z_2$ represents the non-metallic atoms necessary to complete a heterocyclic nucleus of the pyrrole series, X represents an acid radical, and $n$ represents a positive integer of from 1 to 2, with a compound selected from those represented by the following general formula:

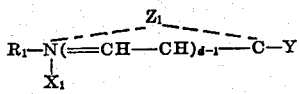

wherein $R_1$ represents an alkyl group, $Z_1$ represents the non-metallic atoms necessary to complete a heterocyclic nucleus containing from 5 to 6 atoms in the heterocyclic ring, $X_1$ represents an acid radical, $d$ represents a positive integer of from 1 to 2, and Y represents a member selected from the group consisting of a halogen atom, an alkylmercapto group, an arylmercapto group, and a $\beta$-arylaminovinyl group.

7. A process according to claim 6 wherein the condensation is carried out in the presence of a basic-condensing agent.

8. A process according to claim 7 wherein triethylamine is employed as the basic condensing agent.

9. The polymethine dye having the following formula:

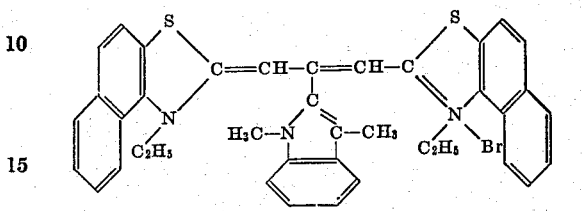

DONALD W. HESELTINE.
LESLIE G. S. BROOKER.

No references cited.